Sept. 14, 1926.
H. E. CROWTHER ET AL
1,600,097
QUEEN BEE INTRODUCER
Filed March 12, 1925
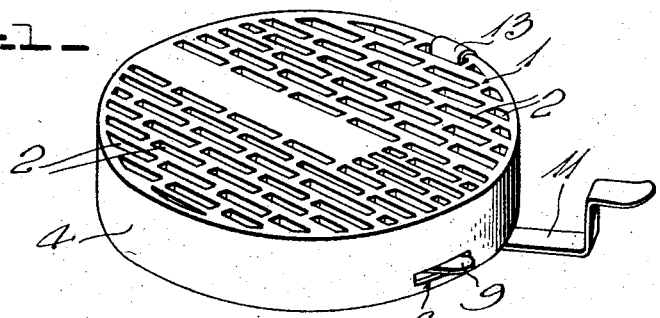
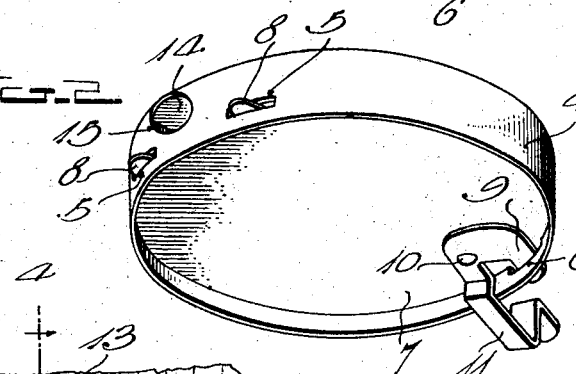
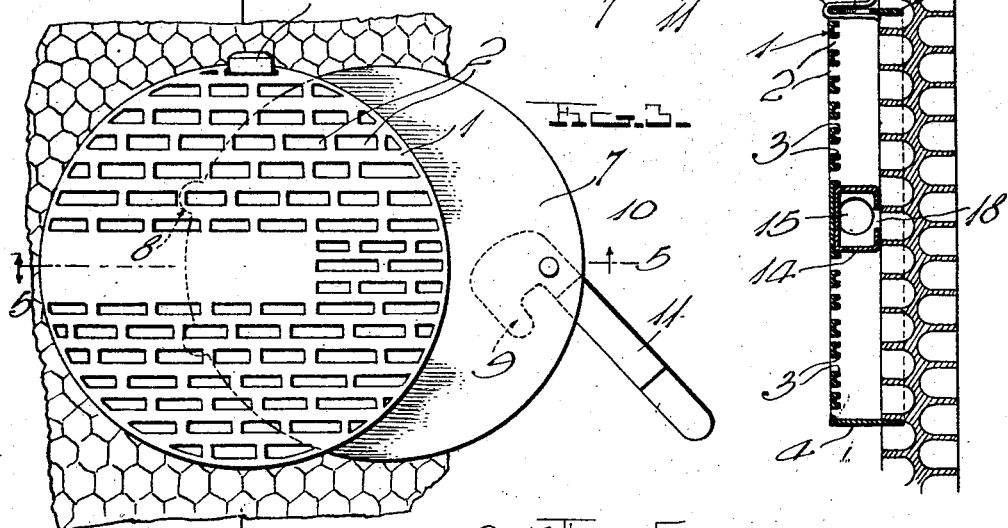
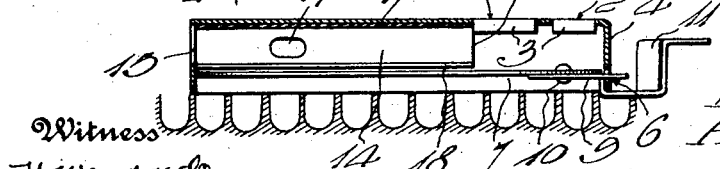
Inventors
H. E. Crowther
A. J. Rhoads, Patented Sept. 14, 1926.

1,600,097

UNITED STATES PATENT OFFICE.

HERMAN E. CROWTHER AND ALBERT J. RHOADS, OF JEFFERSON, OHIO.

QUEEN-BEE INTRODUCER.

Application filed March 12, 1925. Serial No. 15,101.

Our invention aims to provide a new and improved introducer, by means of which a queen bee may be admitted to a colony after the latter has become thoroughly acquainted with her, without the necessity of an attendant making numerous trips to the hive in which the introduction is being effected.

Another object of the invention is to provide an introducer which is provided with an annular flange adapted to be forced into a comb by combining pressure upon the introducer with rotary motion thereof, it having been found that this manner of application is much easier than when the introducer must be merely forced toward the comb, and furthermore there is less danger of breaking the latter.

Another object is to provide a queen introducer comprising a cage for the queen and her attendants, said cage having a worker bee inlet and a queen outlet, both of which are adapted to be closed by candy or other bee food, and are adapted to be successively opened by consumption of the food, so that before the queen is released, some of the worker bees may enter the cage and become acquainted with her, and similarly, some of her attendants may leave the cage, mingle with the colony and return at will.

A still further object is to provide a queen-escape passage from the cage, formed with an open portion at the comb side of said cage and adapted to have said open portion spanned by the comb, whereby at the proper time, the queen may walk directly on the comb as she leaves the cage, it being well known that in a number of instances, queens are reluctant to leave the cage unless they are permitted to tread upon the comb.

A further aim of the invention is to provide a queen cage including a side plate having openings or slots therein, whose edges are provided with guard flanges of such a width that the worker bees on the exterior of the cage are prevented from reaching and stinging the caged queen, before they become properly reconciled.

Yet another aim is to provide the cage with a unique form of removable side plate to trap the queen and her attendants therein, while taking them to the hive, the construction being such that said removable plate may be quickly and easily detached when the cage is to be engaged with the comb.

A still further aim of the invention is to provide a queen introducer which is extremely simple and inexpensive, may be formed entirely of metal and thus easily sterilized, and will be very desirable in all respects.

With the foregoing in view, the invention resides in the novel subject matter hereinafter described and claimed, the description being supplemented by the accompanying drawing.

Figures 1 and 2 are perspective views of an introducer constructed in accordance with our invention, looking in different directions.

Figure 3 is a side elevation showing the manner of applying the cage to a comb.

Figure 4 is a vertical sectional view on the plane indicated by line 4—4 of Fig. 3, illustrating the cage completely applied to the comb.

Figure 5 is a horizontal sectional view on the plane of line 5—5 of Fig. 3, but showing the removable side plate in position with respect to the remainder of the cage instead of partly removed as shown in Fig. 3.

The several features of improvement to which our invention relates may be embodied in numerous forms, but the preferred embodiments of such features are herein disclosed, and are rather specifically described hereinafter.

The numeral 1 designates a sheet metal side wall or plate which is preferably of circular form, said plate or wall being formed with a multiplicity of openings 2 which are preferably in the form of staggered slots formed by laterally stamping portions of said plate or wall. The edges of these openings are provided with guard flanges 3 which may well be formed by the same stamping process which forms the slots 2. These guard flanges prevent the worker bees at the exterior of the device, from reaching and stinging the entrapped queen bee, when the invention is in use.

Extending laterally from the side plate or wall 1, is a continuous annular flange 4 which is adapted to be forced into a honey comb by exerting pressure on the device and by turning it at the same time, so that the flange exerts a shearing action upon the comb. In the present showing, one portion of the flange 4 is formed with a pair of openings 5 and another portion thereof is formed with a similar opening 6, the latter being substantially opposed to said openings 5. A removable side plate 7 which may be fitted within the flange 4 is provided with projecting lugs 8 at its edge for removable passage through the openings 5. This side plate also carries a movable latch 9 for projection through the opening 6, so that the plate may be effectively held within the flange 4 when desired. Preferably, the latch 9 is pivoted to the plate 7 as indicated at 10, and said latch is provided with a releasing handle 11 which extends across the free edge of the flange 4, to be readily accessible to the operator of the device.

The plate 7 is only used prior to engaging the cage with a comb, in order that the queen and her attendants may be carried in the cage to the hive at which they are to be used. They may be placed in the cage or introducer in any desired manner, and in Fig. 4, we have shown an opening 12 for this purpose, which opening may well be alined with an outlet from a queen shipping or mailing container. Any desired means, such as the spring clip 13 engaging the flange 4 may be used to normally close the opening 12.

A queen-escape tube 14 is provided for the introducer. In the present showing, this tube is secured to the inner side of the wall or plate 1 and registers at its outer end with an opening 15 in the flange 4. The inner end 16 of the tube 14 is open, and it is at this point that the queen must enter the tube when she is eventually allowed to escape. When the device is installed in a hive however, the tube 14 is filled with candy or other bee food, so that the only way in which the queen can escape is by the well known "eat out" method. Formed in one side of the tube 14, is a worker-bee inlet opening 17 which is closed by the food within the tube, when the device is initially installed. However, as the worker-bees eat this food away from the outside of the cage, the opening 17 will be eventually uncovered, permitting a number of the worker-bees to enter the cage and get well acquainted with the queen and her attendants, also permitting the latter to leave the cage and mingle with the colony. The opening 17, it will be understood, is sufficiently small to prevent the queen from escaping therethrough, but when the bees have consumed the contents of the tube 14, the queen may pass through the latter and assume her well known role as dictator of the colony.

The side of the tube 14 adjacent the open side of the cage or introducer, is formed with a longitudinal slot 18 which, when the device is in operation is spanned by a portion of the comb, as shown in Fig. 4. Thus, as the queen leaves the cage through the tube 14, she may walk directly upon the comb and hence will have no reluctance about leaving, whereas it is known that some queens object strenuously to leaving the cage when it is necessary that they tread upon the side of an escape tube or the like.

It will be seen from the foregoing that a simple, inexpensive and very desirable introducer has been provided. After the queen bee and her attendants have been caged in the device, the latter is taken to the hive at which it is to be used. The open side of the cage or introducer, that is the side temporarily equipped with the plate 7, is placed against the comb in vertical position as indicated in Figs. 3 and 5; and by now releasing the latch 9 and moving the major portion of the cage outwardly from the comb to a slight extent, the plate 9 may be entirely withdrawn, as fully shown in Fig. 3. Then, inward pressure on the remainder of the introducer and a turning movement imparted thereto at the same time, will cause the free edge portion of the flange 4 to easily penetrate the comb, so that the device will be effectively supported thereby. When in this position, the slot 18 is spanned by the comb, as previously set forth.

After applying the device, the attendant may leave the hive and need not make repeated trips thereto, as the queen will eventually find her escape, without any attention on the part of the bee-keeper. As the contents of the tube 14 are gradually eaten away, first the opening 17 is exposed, permitting some of the worker-bees to enter the cage and also permitting the queen's attendants to leave and enter at will. By the time the remainder of the tube's contents is consumed, the queen and the entire colony have become sufficiently acquainted to permit her release without danger of being attacked and killed, and when she is finally permitted to leave the cage, she may walk directly upon the comb, which has been found to meet the requirements of the most fastidious queens.

We claim:

1. A queen introducer comprising a cage having a worker bee inlet of a size to prevent escape of the queen and also having a queen outlet; said inlet and outlet being adapted to be closed by bee food and being relatively arranged to be successively opened by consumption of the food.

2. A queen introducer comprising a cage, a queen-escape tube in said cage, said tube having a worker bee inlet opening between its outer end and the point at which the queen may enter the tube, said tube and opening being adapted to be closed by bee food.

3. A queen introducer comprising a cage adapted to be supported against a comb and having a queen-escape passage provided with an open portion at the comb side of the cage and adapted to have said open portion spanned by the comb, whereby the queen may walk directly on the comb when she is permitted to leave the cage.

4. A queen introducer comprising a cage having an open side adapted to be closed by a comb, and a queen-escape tube in the cage adapted to be normally closed by bee food, said tube having a longitudinal slot adapted to be spanned by the comb, whereby the queen may walk directly on the comb when she is permitted to leave the cage.

5. A structure as specified in claim 4; said queen-escape tube having a worker bee inlet spaced to one side of said slot.

6. A queen introducing cage comprising an open-work wall having an annular laterally extending flange adapted to be forced into a comb by pressure against and rotation of the cage, and a food-sealed queen-escape tube secured along the inner side of said wall, said tube being spaced inwardly from the free edge of said flange and having a longitudinal slot adapted to be closed by the comb, whereby the queen may walk directly upon the comb when leaving the cage through the tube.

7. A structure as specified in claim 6, said tube having a worker bee inlet spaced to one side of said slot.

8. A queen introducing cage having a side member formed with openings and guard flanges along the edges of said openings to prevent the worker bees on the exterior of the cage from reaching and stinging the caged queen.

9. A queen introducing cage comprising an open-work wall, a continuous flange projecting laterally therefrom and adapted to engage a comb, said flange having substantially opposed openings, a removable side plate fitting within said flange and having a lug projecting removably through one of said openings, and a latch carried by the plate and engageable with the other opening, said latch having a releasing handle extending across the free edge of the flange.

In testimony whereof we have hereunto affixed our signatures.

HERMAN E. CROWTHER.
ALBERT J. RHOADS.